United States Patent
Mouton, Jr. et al.

(10) Patent No.: US 7,617,175 B1
(45) Date of Patent: Nov. 10, 2009

(54) METHOD AND APPARATUS FOR UPGRADING A DATABASE IN A REDUNDANT ENVIRONMENT BY RELEASE CHAINING

(75) Inventors: Jerome A. Mouton, Jr., Palo Alto, CA (US); Alex Van Truong, Santa Clara, CA (US); William P. Buckley, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/295,690

(22) Filed: Apr. 21, 1999

(51) Int. Cl.
G06F 7/00 (2006.01)
G06F 17/30 (2006.01)
(52) U.S. Cl. .................. 707/1; 707/102; 707/203
(58) Field of Classification Search .............. 707/1–10, 707/200–206, 100–104.1; 717/11, 100, 168, 717/170, 122; 709/206; 715/511, 229; 711/142, 711/143, 155
See application file for complete search history.

(56) References Cited

U.S. PATENT DOCUMENTS

| | | | | |
|---|---|---|---|---|
| 5,574,898 A | * | 11/1996 | Leblang et al. ................. 707/1 |
| 5,586,304 A | * | 12/1996 | Stupek et al. ............... 717/170 |
| 5,682,513 A | * | 10/1997 | Candelaria et al. ........... 711/113 |
| 5,765,171 A | * | 6/1998 | Gehani et al. ................. 707/203 |
| 5,806,078 A | * | 9/1998 | Hug et al. ..................... 715/511 |
| 5,835,911 A | * | 11/1998 | Nakagawa et al. ............. 707/10 |
| 5,970,503 A | * | 10/1999 | Eisenberg ................... 707/203 |
| 6,016,107 A | | 1/2000 | Kampe et al. |
| 6,055,413 A | | 4/2000 | Morse et al. |
| 6,098,079 A | * | 8/2000 | Howard ....................... 707/205 |
| 6,101,545 A | * | 8/2000 | Balcerowski et al. ........ 709/230 |
| 6,122,639 A | * | 9/2000 | Babu et al. ............... 707/103 R |
| 6,148,329 A | * | 11/2000 | Meyer .......................... 709/206 |
| 6,205,579 B1 | * | 3/2001 | Southgate ..................... 717/11 |
| 6,229,790 B1 | | 5/2001 | Butrym et al. |
| 6,349,203 B1 | | 2/2002 | Asaoka et al. |
| 6,360,363 B1 | * | 3/2002 | Moser et al. ................. 717/170 |
| 6,415,315 B1 | | 7/2002 | Glass |
| 6,418,456 B1 | | 7/2002 | Mastie et al. |
| 6,549,918 B1 | * | 4/2003 | Probert et al. ................ 707/203 |

FOREIGN PATENT DOCUMENTS

EP 0 520 459 A2 * 12/1992 .................. 707/203
EP 0520459 A2 * 12/1992

OTHER PUBLICATIONS

Chou et al., Versions and change notification in an object-oriented database system, Jun. 12-15, 1988, IEEE, 275-281.*
Noronha et al., Extending a structured document model with version control, Jul. 8-10, 1998, IEEE, 234-242.*

* cited by examiner

Primary Examiner—Jean B Fleurantin
(74) Attorney, Agent, or Firm—Schwegman, Lundberg & Woessner, P.A.

(57) ABSTRACT

What is disclosed is a method of updating a message from a first version to an upgraded version by chaining through intermediate versions, including the steps of receiving an update message having a first version format, and repeatedly generating a revised update message having a next most recent version format based on the update message until a final update message having an upgraded version format is generated. An apparatus for performing the method is also disclosed.

12 Claims, 8 Drawing Sheets

METHOD AND APPARATUS FOR UPGRADING A DATABASE IN A REDUNDANT ENVIRONMENT BY RELEASE CHAINING

FIELD OF THE INVENTION

This invention relates to database data and structure upgrades. Specifically, this invention is directed towards the upgrading of a database in a redundancy environment by release chaining.

BACKGROUND

A database as described herein consists of one or more related tables of compound data structures. The database's schema is defined as the organization of its tables and the relationships among them. A version of such a database is a specific schema and the specific data in the structures. As they evolve over time, databases are embodied in a series of versions, each with a changed schema and new data elements. A new version of the database is generated from an old one by upgrading its schema and mapping its data to the new schema. Database software will generally support upgrading from any of several previous versions.

Certain database systems provide fault tolerance by maintaining redundant images of a database, and using the mirrored images in case of failure of the primary database. A messaging protocol is used to keep mirror images identical to the primary database. The basic protocol is the transmission of a message containing one or more database records, in a specific format, to the respective mirror databases, and commitment of the data upon receiving an acknowledgement, or backout in case of failure.

In a redundancy environment, upgrading is sometimes performed by upgrading a mirror image database to the new version and then at the appropriate time switching to use the mirror image as the primary database. In this process, upgrading is performed by receiving database update messages from a previous version and mapping them into the schema of the new version. An empty database structure conforming to the schema of the new version is created to accept these mappings.

A new release of a database software might support the upgrading of databases from up to three previous generations. In existing systems, each new software release provides separate modules for each prior release from which an upgrade is possible. Upgrade code must be developed to map each of these three old releases into the current release, with all of the upgrade code for each new version written anew in each release (using older release code as a model). Thus, if the latest database software is at release 4, and assuming that releases have been numbered only at full numeral versions (e.g., release 1, release 2 and release 3), then the upgrade code for release 4 must contain code to convert the databases to release 4 directly from release 1, release 2, or release 3.

The current upgrade system requires the duplication of code for mapping and writing databases for each prior supported version. This also increases complexity in code as analysis must be done between any prior release and the newest release to understand how different versions must be changed to arrive at the latest release. For example, developing the release 2 to release 4 upgrade code using the current approach involves understanding changes from release 2 to release 3, and release 3 to release 4, and combining them into a single module. In addition, the complexity of mapping an update message into the database itself must also be included in each set of upgrade code.

SUMMARY

It is therefore an object of the present invention to reduce the amount of code development necessary in developing a new release of a database system and operating code.

It is a further object of the present invention to reduce the amount of code redundancy from one version of the operating code as compared to an earlier version.

These and other objects of the invention are provided by a system that provides for version upgrades of the database to be processed in a chained manner. Update protocol messages from a previous version are mapped into protocol messages of the next most recent version. These are mapped, in turn, to a more recent version until the message of the current version has been derived. Then, the current version update message is processed as in a normal database update to write the current version of the database.

Other objects, features, and advantages of the present invention will be apparent from the accompanying drawings and from the detailed description which follows below.

BRIEF DESCRIPTION OF THE DRAWINGS

The system is illustrated by way of example and not limitation in the figures of the accompanying drawings in which like references indicate similar elements and in which.

DETAILED DESCRIPTION

In order to reduce code redundancy and possibilities for error in the generation of new code, the system provides for version upgrades of the database to be processed in a chained manner. The databases used in the present invention may be any databases for which a message-based upgrade protocol is used. Update protocol messages from a previous version are mapped into protocol messages of the next most recent version. These are mapped, in turn, to a more recent version until the message of the current version has been derived. Then, the current version update message is processed as in a normal database update to write the current version of the database.

For example, in a release 4 system, upgrading a database from release 2 involves the following sequence:

1. Receiving the release 2 update message;
2. Mapping the release 2 update message into a release 3 update message;
3. Mapping the release 3 update message into a release 4 update message; and,
4. Updating the release 4 database using the normal update code.

Benefits of release chaining include:

Reduced Code Development: Instead of developing essentially new code to map each of several old version messages into the current version, it is only necessary to develop code to map the most recent version into the current version. Older version are processed by chaining to this new code.

Improved Quality: While upgrade code is usually performed once per customer, database update code is used every day in every system. So, much of the code for performing upgrades is much more thoroughly tested than in the old method. In addition, the "links" in the chain for older versions are identical code to that used for upgrades in earlier versions, so the upgrades also benefit from being exercised during all the upgrades performed previously. In the prior art, all of the upgrade code for each new version was basically written new in each release of software (using older release software code as a model).

Consistency: Since the update code for the current version database is used to actually write the upgraded databases, it is always written in exactly the same manner as for other operations.

Reduced Code Redundancy: Instead of duplicate code for each supported release of software for mapping and writing databases, all mapping of one version's format and data occurs in one module rather than in several places. For example, in the old method the mapping contained in release 3 software to release 4 software is also implicitly included in the mapping from release 2 software to release 4 software. With chaining, update messages conforming to release 2 software is mapped to messages conforming to release 3 software, these messages are mapped to conform to messages generated by release 4 software, then the database is updated using messages generated by release 4 update code.

Reduced Code Complexity: Developing the release 2 to release 4 upgrade code using the old method involves understanding changes from different versions of the database supported by the different releases of software, and combining them into a single module. In addition, the complexity of mapping an update message into the database itself must also be included in each set of upgrade code. In the chained method, code to map release 2 to release 3 is written once—in release 3—and only maps release 2 update messages to release 3 messages. Writing an update message to the database is always done with the update code of the current release.

The databases in one embodiment of the present invention are contained in a real-time network switch containing redundant processors. The databases consist of data structures needed to perform the various functions of the network switch, including the control of the switching and the maintenance of historical data for the network. The databases are stored in memory devices such as random access memory or battery-backed random access memory on the network switch. Although the invention is described in context of use in a network switching device, the invention applies to any database using a message-based update protocol.

Figure 1:
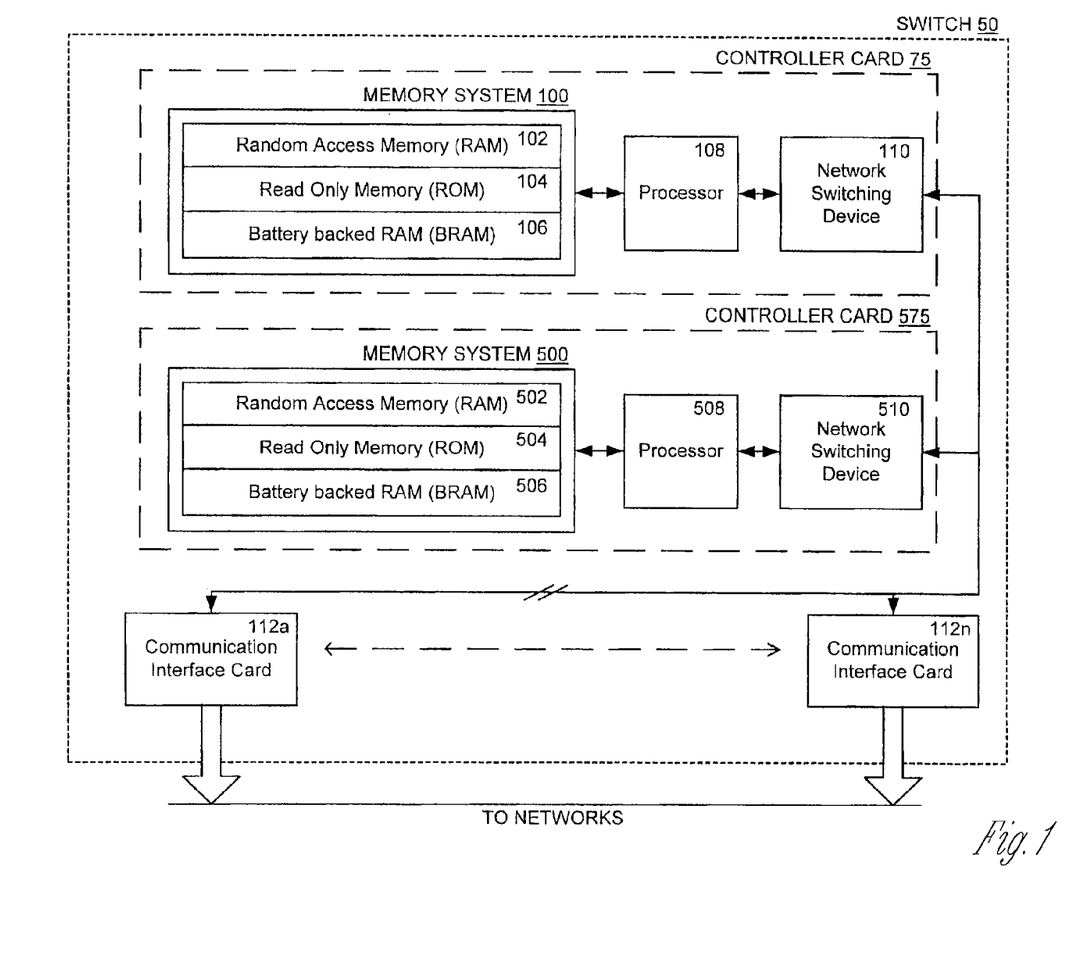
FIG. 1 is a block diagram of a switch containing a set memory systems configured in accordance to one embodiment of the present invention.

FIG. 1 is a block diagram of a switch 50 containing a control card 75 with a memory system 100 configured in accordance with one embodiment of the present invention. Memory system 100 contains a random access memory (RAM) 102, a read only memory (ROM) 104, and a battery backed random access memory (BRAM) 106. RAM 102 may be implemented using dynamic RAM (DRAM) or synchronous DRAM (SDRAM). ROM 104 may be implemented using flash memory or such non-volatile memory devices as magnetic and/or optical drives. BRAM 106 is implemented as RAM that has back-up power supplied by batteries. Similar to ROM 104, BRAM 106 may also be implemented using other types of non-volatile storage medium. Depending on the performance requirements of the specific implementation, RAM 102, ROM 104, and BRAM 106 may be implemented using other types of storage devices. In a preferred embodiment, RAM 102 and BRAM 106 must be implemented with storage devices that are writable.

Memory system 100 contains the program code and data necessary in the operation of switch 50. Switch 50 uses RAM 102 to store the running code and the active configuration databases. The databases include routing tables for the network to which switch 50 is connected, status tables to hold the status of the cards in switch 50, and the other tables used in the operation of switch 50.

If switch 50 fails (e.g., switch 50 suffers a power loss or is reset), RAM 102 is cleared as it becomes un-powered. ROM 104 is then used to recover the program code in RAM 102 once switch 50 is operational again as ROM 104 is a non-volatile memory. BRAM 106 contains a back-up of the set databases. This back-up set of databases is continuously maintained and updated by the executing code in RAM 102. Even if switch 50 fails, RAM 102 may be refreshed by the data retrieved from BRAM 106. RAM 102 is used in the execution of code and storage of the active configuration databases as RAM 102 is generally faster in operation than ROM 104 and BRAM 106.

Coupled to memory system 100 is a processor 108, which is a processor that executes the code in memory system 100 during the operation of switch 50. Processor 108 is also coupled to a networking switching device 110. Network switching device 110 controls the switching of data for a set of communication interface cards 112. Communication interface cards 112 send and receive data from a network (not shown). Memory system 100, processor 108, and network switching device 110 are contained on controller card 75.

Switch 50 also contains a second controller card 575 that acts as a back-up for controller card 75. Thus, in case controller card 75 suffers an error in software or fails in hardware, second controller card 575 can take over and operation in switch 50 can continue with the minimal of interruption. Controller card 575 contains a memory system 500 that acts in the exact manner as memory system 100 does for controller card 75. Memory system 500 contains a RAM 502 (for storing executing operating code and databases), a ROM 504 (for storing an image of the operating code), and a BRAM 506 (for storing a back-up of the databases). Memory system 500 is coupled to a processor 508 and a network switching device 510. The description to memory system 100, processor 108 and network switching device 110 are also applicable to memory system 500, processor 508 and network switching device 510 in terms of operation and function. As the standby card, second controller card 575 maintains a backup of the databases and operating code in memory system 500 that is contained in memory system 100. The databases in memory system 500 of controller card 575 are updated by using update messages generated from the databases in memory system 100 of controller card 75.

FIGS. 2a-2d is a series of diagrams illustrating the changes in the software contained in memory system 100 and memory system 500 during an upgrade. FIGS. 2a-2d is described with reference to FIG. 3, which is a flow diagram illustrating the sequence of events in the upgrade process. Generally, the process involves loading an image of the new release of operating code into ROM 104 and RAM 502. The process continues with creating new database structures in RAM 502, which conform to the specifications of the latest version, and updating the structures with update messages generated from the databases in RAM 102. The databases in BRAM 506, which still conform to the schema of the old version, are also updated as a safeguard such that controller card 575 can still be used as an active card.

The latest mapping functions are hard-coded into the software image of the new release. All the upgrade processing is performed through execution of the new release code. The "old versions" of the mappers are compiled and used in the new release software module, but the object code of these mappers is not the same as when they were compiled for the old release because of different addresses and offsets in the new release. So, the source of those mappers is the same in the new release, but the executable code is quite different.

Initially, the update messages that are generated from the databases in RAM 102 conform to the older version of the database and cannot be directly used to update the databases in RAM 502 as the databases in RAM 502 are of a newer, different version. Thus, the format and content of the update messages are first upgraded to the latest version (e.g., the version of the databases in RAM 502), using one or more intermediary mappers before the update message can be used to update the databases in RAM 502. The update messages for BRAM 506 still require the old version of the update messages as the version of the databases in BRAM 506 are the same as the version of the databases in RAM 102. After the databases in RAM 502 have been completely populated through the use of upgraded update messages and control has been switched over to controller card 575 from controller card 75, the databases in RAM 502 are copied to BRAM 506, replacing the prior version databases in BRAM 506.

Figure 2A:
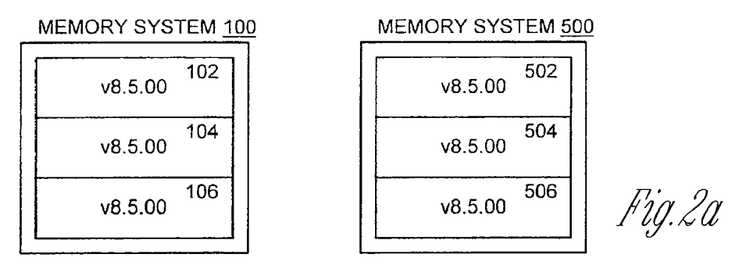
FIGS. 2a-2d is a set of block diagrams illustrating changes in the memory systems of FIG. 1 during an upgrade performed in accordance with one embodiment of the present invention.

FIG. 2a shows the release numbers of the software in RAM 102, ROM 104, and BRAM 106 of memory system 100 and in RAM 502, ROM 504, and BRAM 506 of memory system 500 before the upgrade. RAM 102 and RAM 502 contain the operating code and the active databases, both of which are at version 8.5.00. ROM 104 and ROM 504 contain a non-volatile copy of the code, which is also at version 8.5.00. BRAM 106 and BRAM 506 contain the battery backed copies of the databases, which are at version 8.5.00. For purposes of explanation, it is assumed that controller card 75 is the active controller card and controller card 575 is the standby controller card.

Figure 2B:
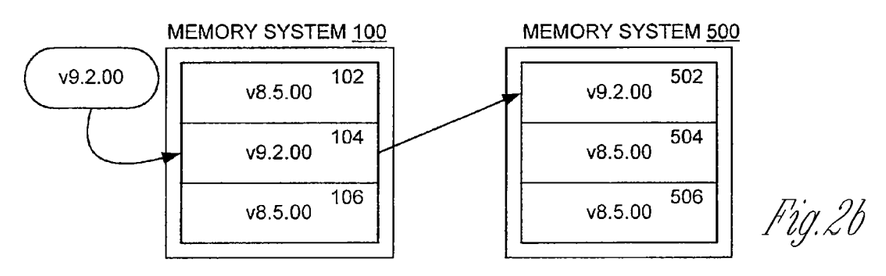
Figure 3:
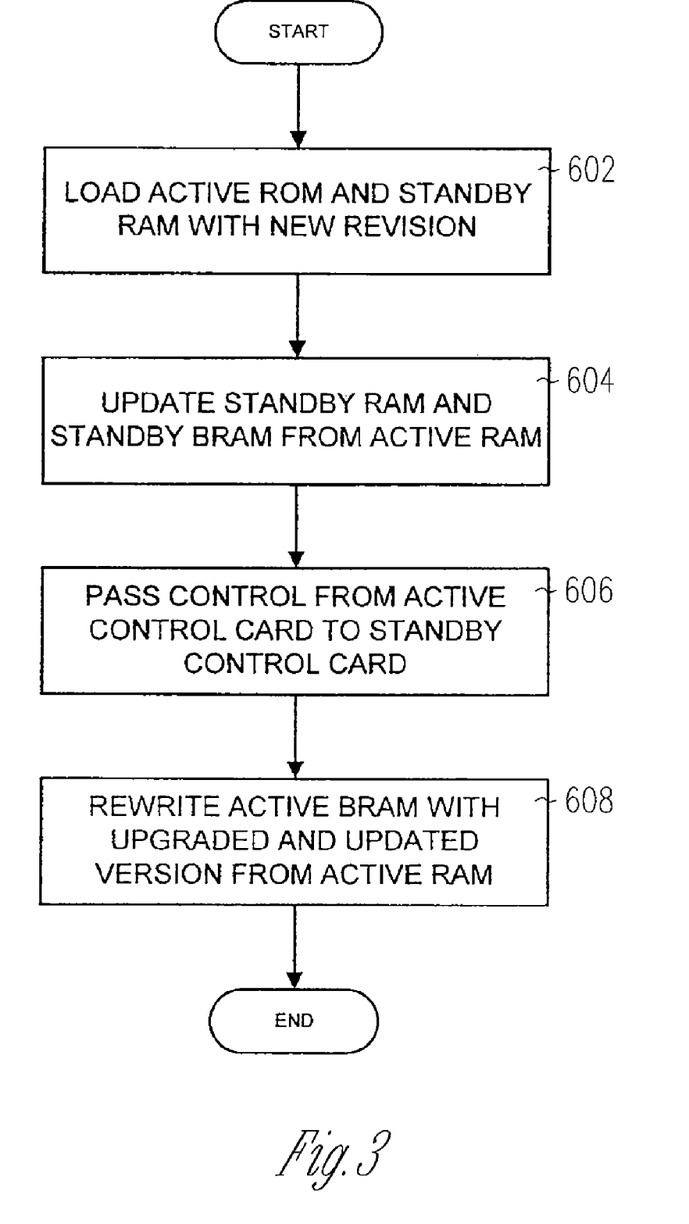
FIG. 3 is a flow diagram illustrating a process for upgrading the memory systems in FIGS. 2a-2d in accordance with one embodiment of the present invention.

Referring to FIG. 2b and block 600 of FIG. 3, the active ROM and the standby RAM (e.g., ROM 104 and RAM 502, respectively), are loaded with an image of the updated release of the operating code, version 9.2.00, using a protocol such as the trivial file transfer protocol (TFTP). The loaded image contains all code needed for the operation of switch 50, which includes code needed to upgrade the databases contained in switch 50. The configuration databases in RAM 502 are cleared by the loading of the new software image. The old versions of the databases are flushed from RAM 502 because these databases are not fully compatible with the new software. As described above, incompatibilities between the old versions of the databases and the new operating code are due to changes in the schema of the new databases and changes in the new operating code to operate with the new formats.

After ROM 104 and RAM 502 are loaded with the new release of the code, any reset or re-initialization of switch 50 results in the standby controller card, controller card 575, becoming the active controller card and loading the old release operating code image from ROM 504. Controller card 575 then rebuilds the databases in RAM 502 using the old version of the databases contained in BRAM 506. Controller card 575 becomes the active controller card as the ROM in controller card 75, which contains the operating code for the new version of the database has not been specified by the user as the primary version.

Figure 2C:
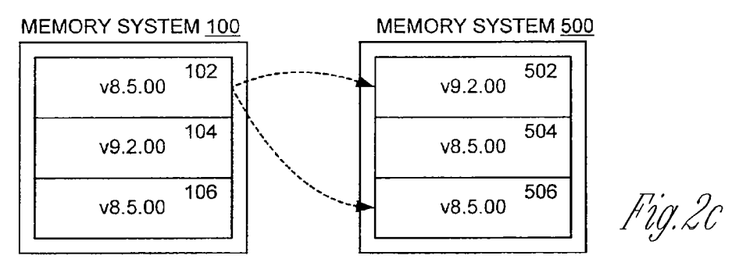

As shown in FIG. 2c and in block 602 of FIG. 3, the new version of the databases in RAM 502 is updated with update messages from RAM 102. As described below, the update is performed by chaining mappings from one version to the next. After block 602, the upgraded databases in RAM 502 have been updated with the most current information from RAM 102. As the databases in RAM 502 are being updated using chain mapped updates, the databases in BRAM 506 is also constantly being updated using the old version of the update messages. This is because the databases in RAM 102 and BRAM 506 are the same version.

In block 604, the user issues a command to switch 50 to run the new revision. This causes control of switch 50 to pass from the active controller card, controller card 75, to the new version upgraded controller card, controller card 575. When controller card 575 receives control and thus becomes the now active controller card, the software on controller card 575 rechecks local configuration and completes integration of the new databases. This occurs with little or no impact to data transmission through the switch. In the preferred embodiment, the switchover to controller card 575 occurs at user control through a command issued by the user and does not take place automatically.

Figure 2D:
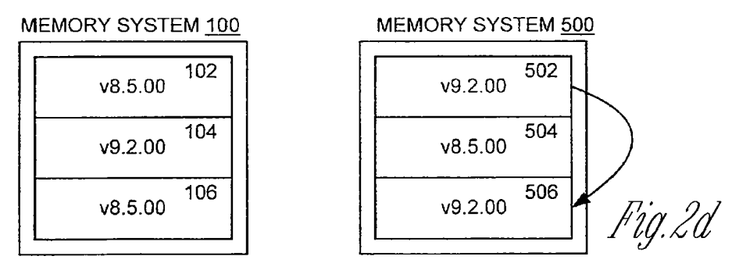

In block 606, as the databases in BRAM 506 can no longer be used as the databases in BRAM 506 is an older version, the system copies the databases in RAM 502 to BRAM 506, replacing the databases in BRAM 506 with the latest version. This is shown in FIG. 2d. The new version databases are not rewritten to BRAM until after the switchover has been requested and completed in a satisfactory manner to allow the controller card 575 to still act as an active controller card in case there is a problem with the upgrade. After the databases have been copied to BRAM 506 from RAM 502, ROM 504 is also upgraded with the new release of the operating code image and operation continues as normal with the upgraded software.

Figure 4:
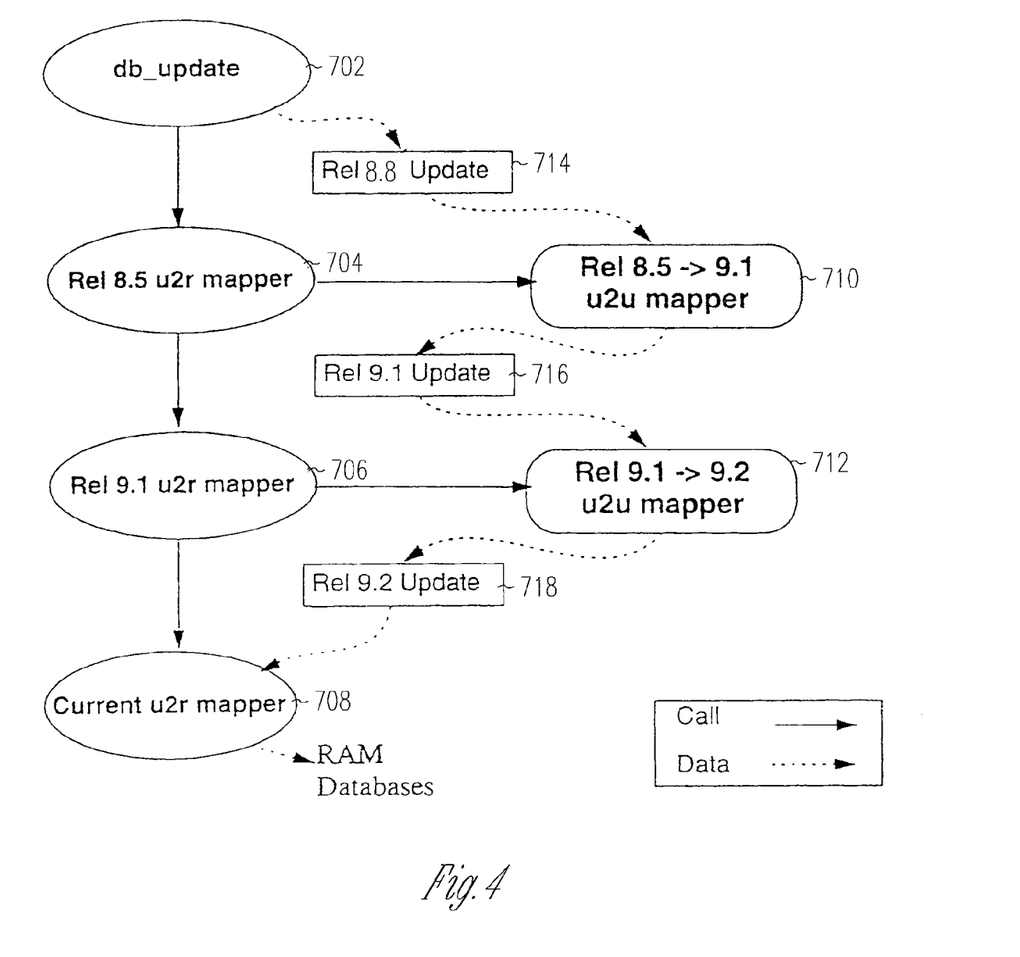
FIG. 4 is a diagram illustrating the flow of update messages through a set of update and upgrade functions provided by one embodiment of the present invention to upgrade the memory systems of FIGS. 2a-2d.

FIG. 4 illustrates the function call and associated data flow for the chained upgrade process used in block 602. The upgrade, which is initiated by a user, begins when the system calls a db_update function 702. Db_update function 702 is directed to update the databases in RAM 502 by using a release 8.5 update message (Rel 8.5 Update) 714.

The first mapping in the upgrade sequence uses a release 8.5 update to RAM mapper (Rel 8.5 u2r mapper) 704 to build a release 9.1 update message (Rel 9.1 Update) 716 from Rel 8.5 Update 714. Rel 8.5 u2r mapper 704 calls a release 8.5 to release 9.1 update to update mapper (Rel 8.5->9.1 u2u mapper) 710 to generate Rel 9.1 Update 716.

After Rel 9.1 Update 716 has been created, a release 9.1 update to RAM mapper (Rel 9.1 u2r mapper) 706 is called to create a release 9.2 update message (Rel 9.2 Update) 718. A release 9.1 to 9.2 update to update message mapper (Rel 9.1->9.2 u2u mapper) 712, which is a function similar to Rel 9.1->9.2 u2u mapper 712, is called by Rel 9.1 u2r mapper 706 to create Rel 9.2 Update 718.

Assuming that there are no further mappings necessary in the upgrade process after Rel 9.1->9.2 u2u mapper 412 is executed, the last part of the mapping sequence is to call the current update to RAM mapper (Current u2r mapper) 708 to write the Rel 9.2 Update 718 to the databases in RAM 502.

Whether there are one or several update messages generated for each database to be updated is a design decision by the implementers of each database. In some cases one update message is used for the whole database (e.g., the update message contains all the database records for a database), in others the database is sent over in several update messages (e.g., the update message contains a portion of the database records for a database). The decision usually depends on the size and structure of the database, with consideration for the need to have as little loss of data as possible. In addition, whether the schema of a database in the set of databases changes between different releases of software is also an implementation decision. Thus, a new release of the software image does not necessarily mean that there is a new version of a database schema for any of the databases. In the explanation given herein, however, it is assumed that the databases schemas are changed with each release. Specifically, a different release of the software image has a different version of the database schema for at least one database.

FIGS. 5a-5e is a series of diagrams illustrating the changes in the software contained in memory system 100 during an upgrade where switch 50 only contains a single controller card, controller card 75. FIGS. 5a-5e is described with reference to FIG. 6, which is a flow diagram illustrating the sequence of events in the upgrade process. Generally, the process involves loading an image of the new release of operating code into ROM 104 and RAM 102. The process continues with creating new database structures in RAM 102, which conform to the specifications of the latest version, and updating the structures using update messages generated from the databases in BRAM 106. Initially, the update messages that are generated from the databases in BRAM 106 conform to the older version of the database and cannot be directly used to update the databases in RAM 102 as the databases in RAM 102 are of a newer, different version. Thus, the format and content of the update messages are first upgraded to the latest version (i.e., the version of the databases in RAM 102) using one or more intermediary mappers before the update message can be used to update the databases in RAM 102. After the databases in RAM 102 have been completely populated through the use of upgraded update messages, the databases in RAM 102 are copied to BRAM 106, replacing the prior version databases in BRAM 106.

Figure 5A:
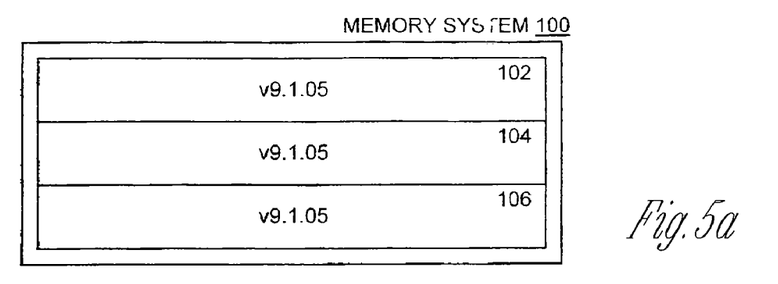
FIGS. 5a-5e is a set of block diagrams illustrating changes in a memory system of FIG. 1 during an upgrade performed in accordance with one embodiment of the present invention.

FIG. 5a shows the release numbers of the software in RAM 102, ROM 104, and BRAM 106 of the memory system 100 before the upgrade. As described above, RAM 102 contains the operating code and the active databases, both of which are at version 9.1.05. ROM 104 contains a non-volatile copy of the code, which is also at release 9.1.05. BRAM 106 contains the battery backed copies of the configuration databases, which are at release 9.1.05.

Figure 5B:
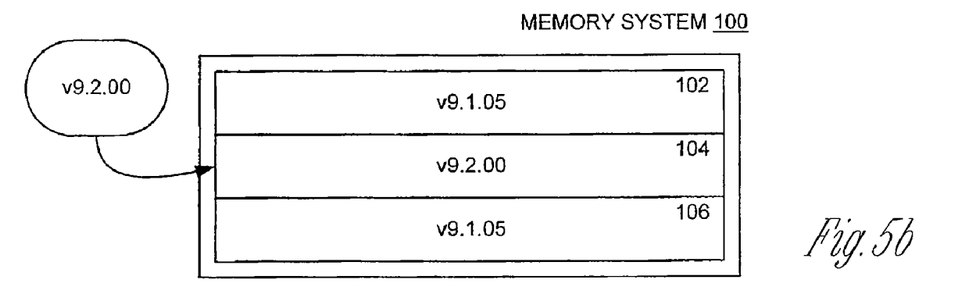
Figure 6:
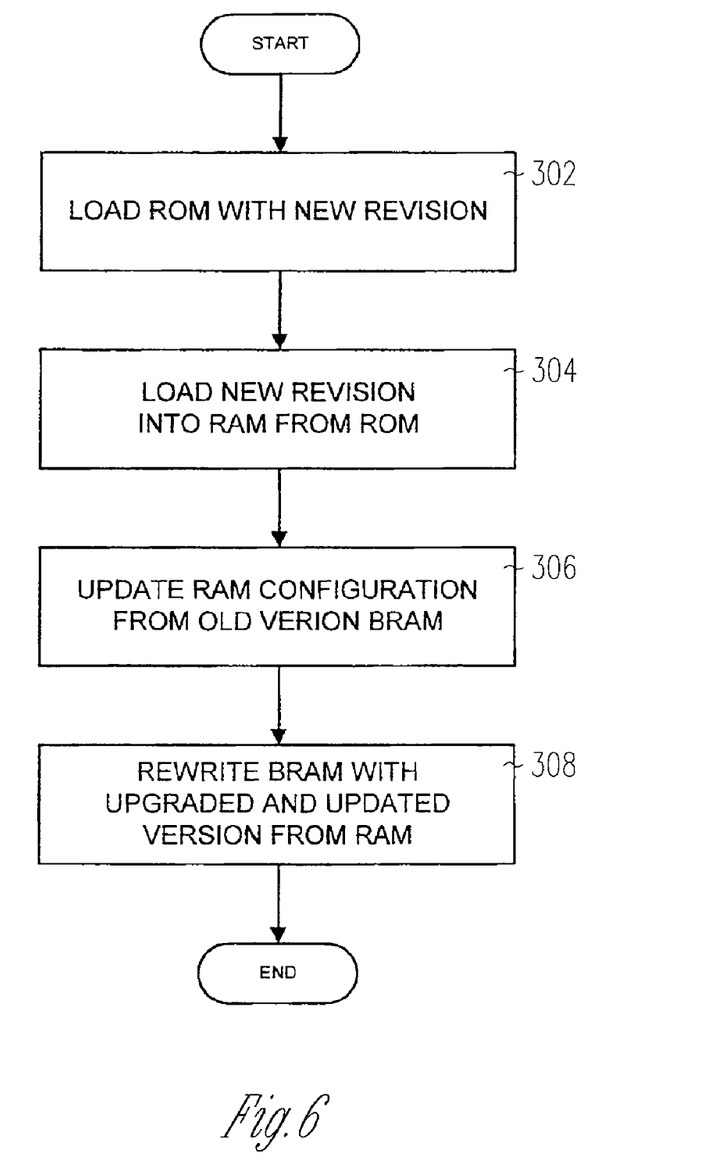
FIG. 6 is a flow diagram illustrating a process for upgrading the memory system in FIGS. 5a-5e in accordance with one embodiment of the present invention.

Referring to FIG. 5b and block 300 of FIG. 6, ROM 104 is loaded with an image of the updated release of the operating code, version 9.2.00, using a protocol such as the trivial file transfer protocol (TFTP). After ROM 104 is loaded with the new release of the code, any reset or re-initialization of switch 50 will cause RAM 102 to be cleared and the code in ROM 104 to be loaded into RAM 102. As described below, the code in ROM 104 is loaded into RAM 102 in block 302, when the user issues an upgrade command.

Figure 5C:
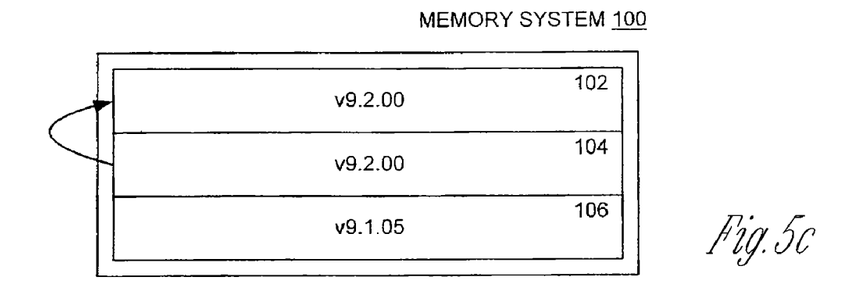

In block 302 of FIG. 6, the new release of the code, version 9.2.00, in ROM 104 is loaded into RAM 102. At this point, the configuration databases in RAM 102 are cleared by the loading of the new software image. The old versions of the databases are flushed from RAM 102 because these databases are not fully compatible with the new software. Incompatibilities between the old versions of the databases and the new operating code are due to changes in the formats of the new databases and changes in the new operating code to operate with the new formats. During the upgrade of switch 50, significant service outage in switch 50 occurs and may last from minutes to hours, depending on the amount of provisioning. Outage occurs due to the lack of a redundant controller card in this embodiment of switch 50 to continue operation when all code and databases in RAM 102 are cleared after the uploading of the image of the new software. The state of memory system 100 after block 302 has completed is shown in FIG. 5c. Nothing of the old release of the software image is preserved in switch 50 past the loading of the new image into RAM 102—except for the configuration databases in BRAM 106.

Figure 5D:
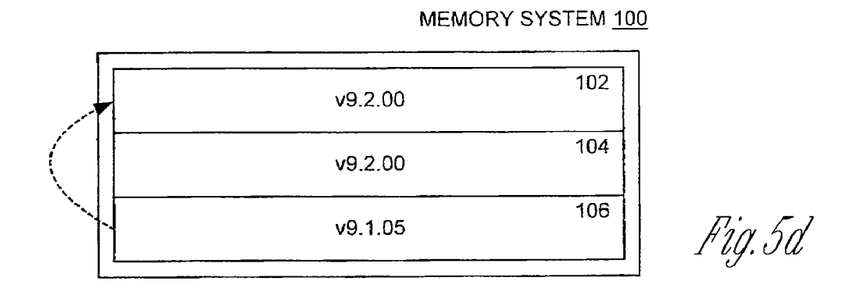
Figure 5E:
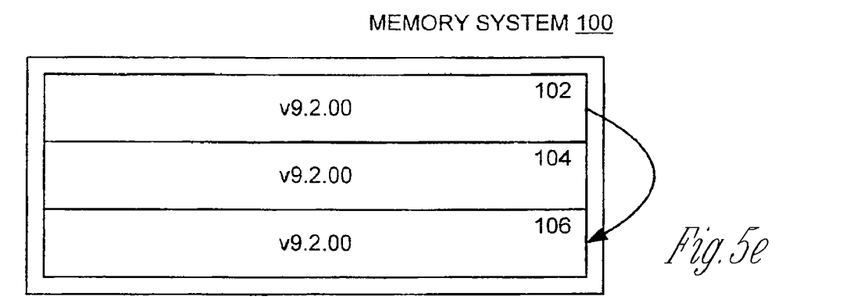

As shown in FIG. 5d and in block 304 of FIG. 6, the new version of the databases in RAM 102 is updated with update messages from BRAM 106. As described below, the update is performed by chaining mappings from one version to the next. After block 304, the upgraded databases in RAM 102 have been updated with the most current information from BRAM 106. Thus, in block 306, as the databases in BRAM 106 can no longer be used as the databases in BRAM 106 is an older version, the system copies the databases in RAM 102 to BRAM 106, replacing the databases in BRAM 106 with the latest version. This is shown in FIG. 5e. After the databases have been copied to BRAM 106 from RAM 102, operation of control card 75 continues as normal with the upgraded software.

Figure 7:
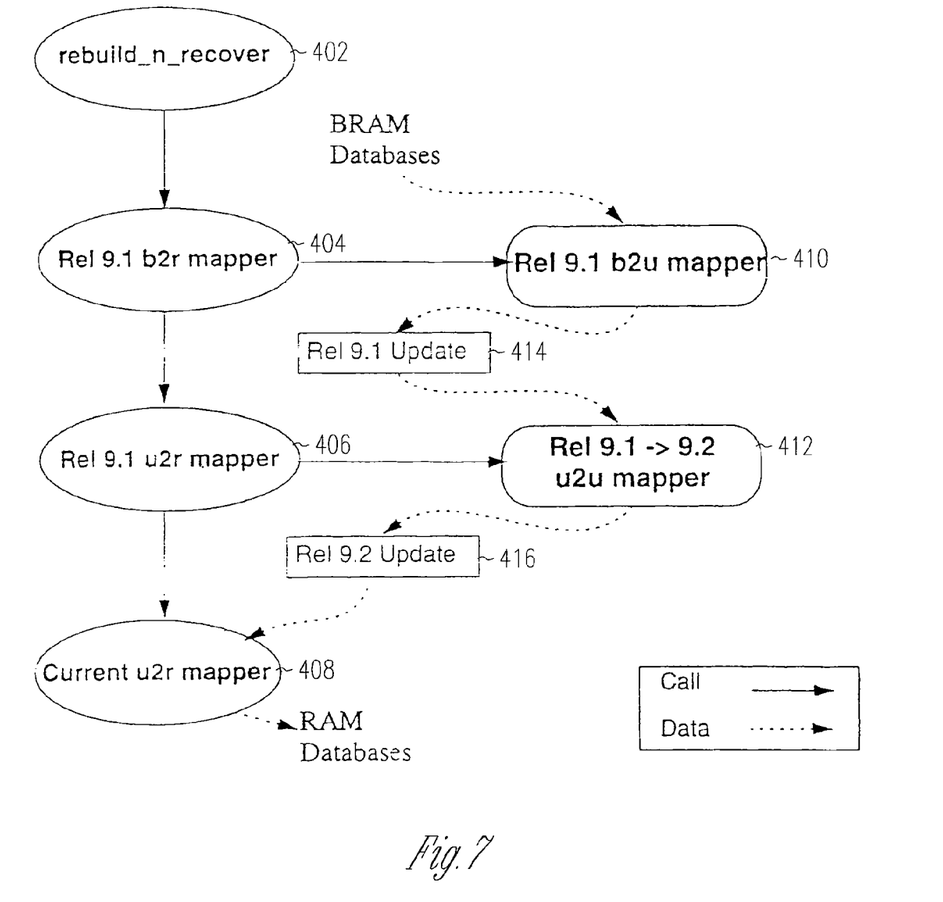
FIG. 7 is a diagram illustrating the flow of update messages through a set of update and upgrade functions provided by one embodiment of the present invention to upgrade the memory systems of FIGS. 5a-5e.

FIG. 7 illustrates the function call and associated data flow for the chained upgrade process used in block 304. The upgrade, which is initiated by a user, begins when the system calls a rebuild_n_recover function 402. Rebuild_n_recover function 402 recreates the databases in RAM 102 by using update messages.

The first mapping in the upgrade sequence uses a release 9.1 BRAM to RAM mapper (Rel 9.1 b2r mapper) 404 to build a release 9.1 update message (Rel 9.1 Update) 414 from the databases in BRAM 106. Rel 9.1 b2r mapper 404 performs the entire function of moving the contents of the databases in BRAM 106 to RAM 102 by invoking a release 9.1 BRAM to Update mapper (Rel 9.1 b2u mapper) 410 to generate Rel 9.1 Update 414. In contrast to the mappings needed for updates in a scenario where switch 50 contains two controller cards, Rel 9.1 b2u mapper 410 is the additional mapping to be performed for an upgrade where switch 50 contains only a single controller card.

After Rel 9.1 Update 414 has been created, a release 9.1 update to RAM mapper (Rel 9.1 u2r mapper) 406 is called to create a release 9.2 update message (Rel 9.2 Update) 416. A release 9.1 to 9.2 update to update message mapper (Rel 9.1->9.2 u2u mapper) 412, which is a function similar to Rel 9.1 b2u mapper 410, is called by Rel 9.1 u2r mapper 406 to create Rel 9.2 Update 416.

Additional mappers may be used in cases where there are more conversions necessary to convert the update message to the latest revision. For example, if the version to be upgraded to were actually release 9.3 instead of release 9.2, then an additional mapping stage would be required. This mapping may be performed by a function such as a release 9.2->9.3 u2u mapper. Assuming that there are no further mappings necessary in the upgrade process after Rel 9.1->9.2 u2u mapper 412 is executed, the last part of the mapping sequence is to call the current update to ram mapper (Current u2r mapper) 408 to write Rel 9.2 Update 416 to the databases in RAM 102.

FIGS. 5-7 describe the situation where controller card 75 is the only controller card in switch 50. In many mission critical applications, however, a desired configuration is to have a second controller card (e.g., controller card 575) in switch 50 to act as a standby controller card. If there is a failure in controller card 75, switch 50 can change over to the second controller card with very little loss of data. To ensure the least amount of latency for transfer, the second, standby, controller card is continuously updated with information from memory system 100 to closely replicate the contents of memory system 100. Unlike the upgrade of a switch containing only one controller card (where significant service outage in the switch occurs and may last from minutes to hour), the upgrade of switch 50 containing a second controller card does not cause significant service outage. In many cases, users might not even be aware when an upgrade has been performed. The minimization of the outage is achieved by the redundant controller card in this embodiment of switch 50 to continue operation while all code and databases in RAM 502 are upgraded and updated.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer-implemented method for upgrading the schema of a database, comprising:
   updating, by the computer, a database update message from a first version to an upgraded version by chaining through one or more intermediate upgraded versions, wherein updating comprises
      receiving an update message having a first version format, and
      repeatedly generating a revised update message having a next most recent version format based on the update message until a final revised update message having the upgraded version format is generated, wherein generating a revised update message having a next most recent version format includes receiving a first update message and calling a next most recent version mapping function to map contents of the first update message to generate a second update message; and
   applying, by the computer, the final revised update message to the database to write an upgraded version of the schema of the database.

2. The method of claim 1, wherein the update message includes a set of records for a database in the first version.

3. The method of claim 2, wherein the set of records for the database in the first version is a complete set of records for the database.

4. A computer readable storage medium having instructions stored thereon, which when executed by a computer, cause the computer to perform a method for upgrading the schema of a database, comprising:
   updating a database update message from a first version to an upgraded version by chaining through one or more intermediate upgraded versions, wherein updating comprises
      receiving an update message having a first version format, and
      generating repeatedly a revised update message having a next most recent version format based on the update message until a final revised update message having the upgraded version format is generated, wherein generating a revised update message having a next most recent version format includes receiving a first update message and calling a next most recent version mapping function to map contents of the first update message to generate a second update message; and
   applying the final revised update message to the database to write an upgraded version of the schema of the database.

5. The computer readable storage medium of claim 4, wherein the update message includes a set of records for a database in the first version.

6. The computer readable storage medium of claim 5, wherein the set of records for the database in the first version is complete set of records for the database.

7. An apparatus comprising:
   a processor; and
   a memory coupled with the processor and storing instructions which, when executed by the processor, cause the processor to update a database update message from a first version to an upgraded version by chaining through one or more intermediate upgraded versions, wherein updating comprises
      receiving an update message having a first version format, and
      repeatedly generating a revised update message having a next most recent format based on the update message until a final revised update message having the upgraded version format is generated, wherein generating a revised update message having a next most recent version format includes receiving a first update message and calling a next most recent version mapping function to map contents of the first update message to generate a second update message and
   apply the final revised update message to a database to write an upgraded version of a schema of the database.

8. The apparatus of claim 7, wherein the update message includes a set of records for a database in the first version.

9. The apparatus of claim 8 wherein the set of records for the database in the first version is a complete set of records for the database.

10. An apparatus for upgrading the schema of a database, comprising:
    a network switching device to receive an update message having a first version format, wherein the network switching device receives a first update message;
    a mapper to call a next most recent version mapping function to map contents of the first update message to generate a second update message; and
    a controller card to update a message from a first version to an upgraded version by chaining through intermediate upgraded versions, the controller card to repeatedly generating a revised update message having a next most recent version format based on the update message until a final revised update message having the upgraded version format is generated and apply the final upgraded version of the update message to the database to write an upgraded version of the schema of the database.

11. The apparatus of claim 10, wherein the update message includes a set of records for a database in the first version.

12. The apparatus of claim 11, wherein the set of records for the database in the first version is a complete set of records for the database.

* * * * *